(12) United States Patent
Backus et al.

(10) Patent No.: US 12,293,394 B2
(45) Date of Patent: *May 6, 2025

(54) PROGRAMMING VERIFICATION RULESETS VISUALLY

(71) Applicant: Plaid Inc., San Francisco, CA (US)

(72) Inventors: John Backus, Miami, FL (US); Faris Toqan, Chicago, IL (US)

(73) Assignee: Plaid Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,806

(22) Filed: Feb. 21, 2024

(65) Prior Publication Data

US 2024/0193653 A1     Jun. 13, 2024

Related U.S. Application Data

(63) Continuation of application No. 18/194,480, filed on Mar. 31, 2023, now Pat. No. 11,935,101.

(60) Provisional application No. 63/362,280, filed on Mar. 31, 2022.

(51) Int. Cl.
| | |
|---|---|
| *G06Q 30/0601* | (2023.01) |
| *G06F 3/0481* | (2022.01) |
| *G06F 3/0482* | (2013.01) |
| *G06F 8/38* | (2018.01) |
| *G06F 9/448* | (2018.01) |
| *G06F 9/451* | (2018.01) |
| *G06F 21/32* | (2013.01) |

(Continued)

(52) U.S. Cl.
CPC ....... *G06Q 30/0609* (2013.01); *G06F 3/0481* (2013.01); *G06F 3/0482* (2013.01); *G06F 8/38* (2013.01); *G06F 9/4498* (2018.02); *G06F 9/451* (2018.02); *G06F 21/32* (2013.01); *G06F 21/36* (2013.01); *H04L 63/0876* (2013.01); *H04L 63/0884* (2013.01)

(58) Field of Classification Search
CPC ........ G06F 3/0481; G06F 3/0482; G06F 8/38; G06F 9/451; G06F 21/32; G06F 21/36; G06Q 30/0609; H04L 63/0876; H04L 63/0884

See application file for complete search history.

(56) References Cited

U.S. PATENT DOCUMENTS

| | | | |
|---|---|---|---|
| 2004/0243477 A1* | 12/2004 | Mathai | G06Q 30/0633 705/26.8 |
| 2011/0047014 A1* | 2/2011 | De Angelo | G06F 3/0482 715/810 |
| 2013/0159188 A1 | 6/2013 | Andon | |

(Continued)

*Primary Examiner* — Seth A Silverman
(74) *Attorney, Agent, or Firm* — Harrity & Harrity, LLP

(57) ABSTRACT

In some implementations, a verification system may generate a selector associated with a plurality of countries. The verification system may receive an indication of a selected country from the plurality of countries. Accordingly, the verification system may generate one or more visual regions, where each visual region is associated with a corresponding verification rule and includes at least one pair of visual selectors with a first selector associated with a type of user information and a second selector associated with a type of matching. The verification system may modify the verification rule based on interaction with the at least one pair of visual selectors included in a corresponding visual region of the one or more visual regions.

20 Claims, 11 Drawing Sheets

(51) Int. Cl.
*G06F 21/36* (2013.01)
*H04L 9/40* (2022.01)

(56) References Cited

U.S. PATENT DOCUMENTS

| | | |
|---|---|---|
| 2014/0173713 A1* | 6/2014 | Zheng .................. G06F 3/0488 |
| | | 726/16 |
| 2019/0213608 A1 | 7/2019 | Ouyang et al. |
| 2021/0209606 A1* | 7/2021 | Herlands ............ G06Q 20/4016 |
| 2022/0254045 A1 | 8/2022 | Boardman et al. |
| 2023/0316356 A1 | 10/2023 | Backus et al. |

* cited by examiner

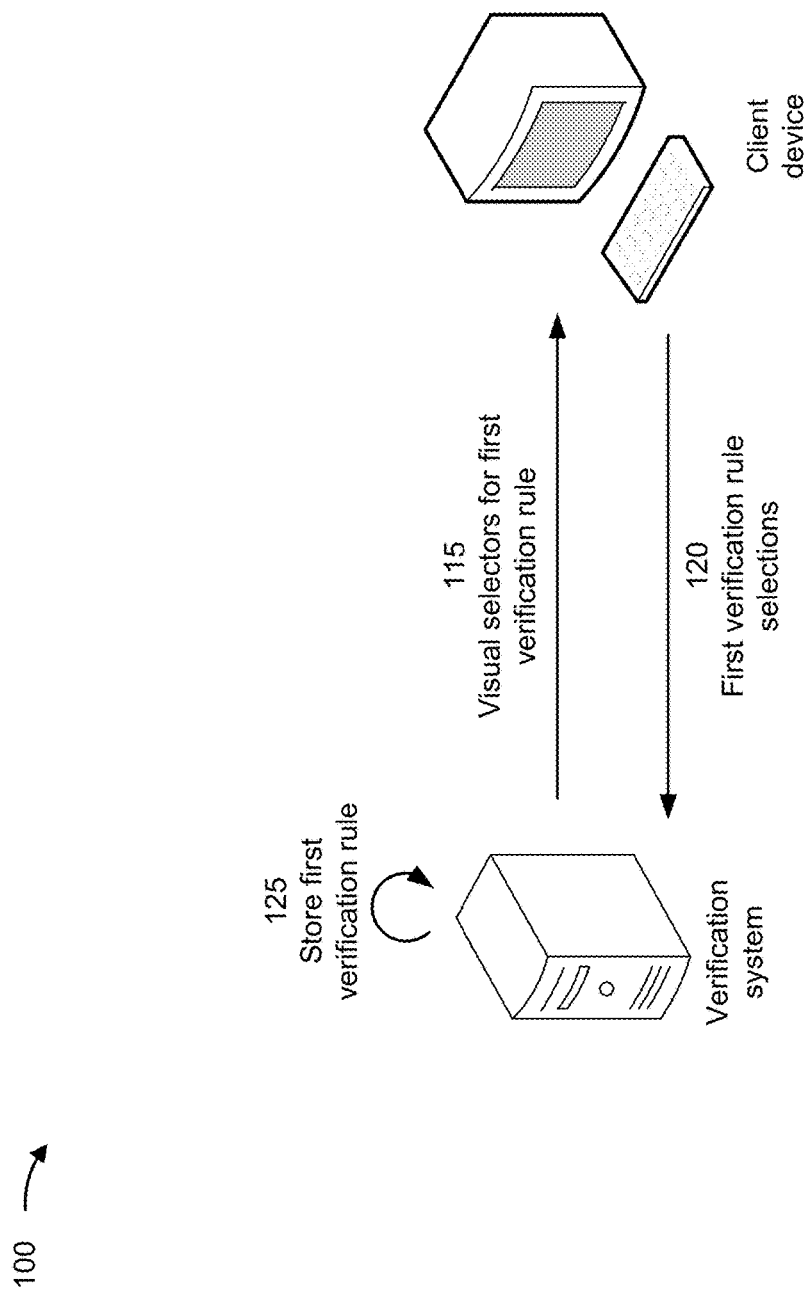

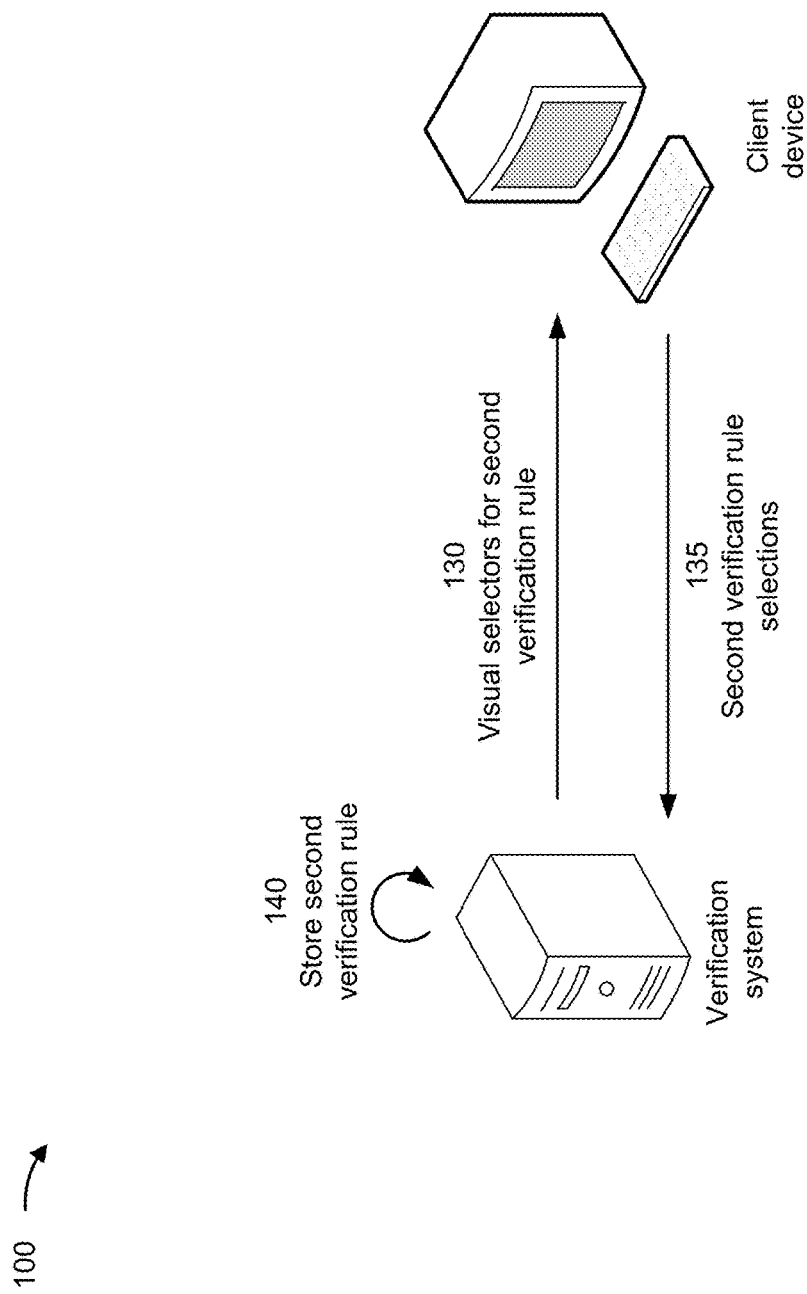

PROGRAMMING VERIFICATION RULESETS VISUALLY

CROSS-REFERENCE TO RELATED APPLICATION

This application is a continuation of U.S. patent application Ser. No. 18/194,480, filed on Mar. 31, 2023, which claims priority to U.S. Provisional Patent Application No. 63/362,280, filed on Mar. 31, 2022, the contents of which are incorporated herein by reference in their entireties.

BACKGROUND

Know-your-client (KYC) requirements often impact verification procedures implemented for onboarding new users. For example, different countries may be associated with different KYC requirements.

SUMMARY

Some implementations described herein relate to a system for providing a visual interface for programming verification rulesets. The system may include one or more memories and one or more processors communicatively coupled to the one or more memories. The one or more processors may be configured to generate a selector associated with a plurality of countries. The one or more processors may be configured to receive an indication of a selected country from the plurality of countries. The one or more processors may be configured to generate one or more visual regions, wherein each visual region is associated with a corresponding verification rule and includes at least one pair of visual selectors with a first selector associated with a type of user information and a second selector associated with a type of matching. The one or more processors may be configured to modify the verification rule based on interaction with the at least one pair of visual selectors included in a corresponding visual region of the one or more visual regions. The one or more processors may be configured to receive input associated with a user. The one or more processors may be configured to determine whether to verify the user by applying the input to the modified verification rule.

Some implementations described herein relate to a method of providing a visual interface for programming verification rulesets. The method may include generating a selector associated with a plurality of countries. The method may include receiving an indication of a selected country from the plurality of countries. The method may include generating one or more visual regions, wherein each visual region is associated with a corresponding verification rule and includes at least one pair of visual selectors with a first selector associated with a type of user information and a second selector associated with a type of matching. The method may include modifying the verification rule based on interaction with the at least one pair of visual selectors included in a corresponding visual region of the one or more visual regions.

Some implementations described herein relate to a non-transitory computer-readable medium that stores a set of instructions for providing a visual interface for programming verification rulesets for a device. The set of instructions, when executed by one or more processors of the device, may cause the device to receive an indication of a selected country from a plurality of countries. The set of instructions, when executed by one or more processors of the device, may cause the device to generate one or more visual regions, wherein each visual region is associated with a corresponding verification rule and includes at least one pair of visual selectors. The set of instructions, when executed by one or more processors of the device, may cause the device to modify the verification rule based on interaction with the at least one pair of visual selectors included in the corresponding visual region.

BRIEF DESCRIPTION OF THE DRAWINGS

FIGS. 1A-1G are diagrams of an example implementation relating to programming verification rulesets visually.

DETAILED DESCRIPTION

The following detailed description of example implementations refers to the accompanying drawings. The same reference numbers in different drawings may identify the same or similar elements.

Programming verification rulesets according to know-your-client (KYC) requirements generally consumes significant power and processing resources. For example, multiple cycles of coding and debugging are used, and each cycle of coding and debugging consumes more power and processing resources.

Some implementations described herein provide for visual interfaces that allow for constructing verification rulesets. Accordingly, using the visual interfaces conserves memory space, power, and processing resources as compared with multiple cycles of coding, compiling, and debugging the verification rulesets. Additionally, some implementations described herein provide for verification rulesets to be customized on a per-country basis. As a result, memory space, power, and processing resources are conserved as compared with re-performing (e.g., from scratch) cycles of compiling and debugging for each country's rulesets individually.

FIGS. 1A-1G are diagrams of an example 100 associated with programming verification rulesets visually. As shown in FIGS. 1A-1G, example 100 includes a verification system, a client device, and a user device. These devices are described in more detail in connection with FIGS. 3 and 4.

Figure 1A:
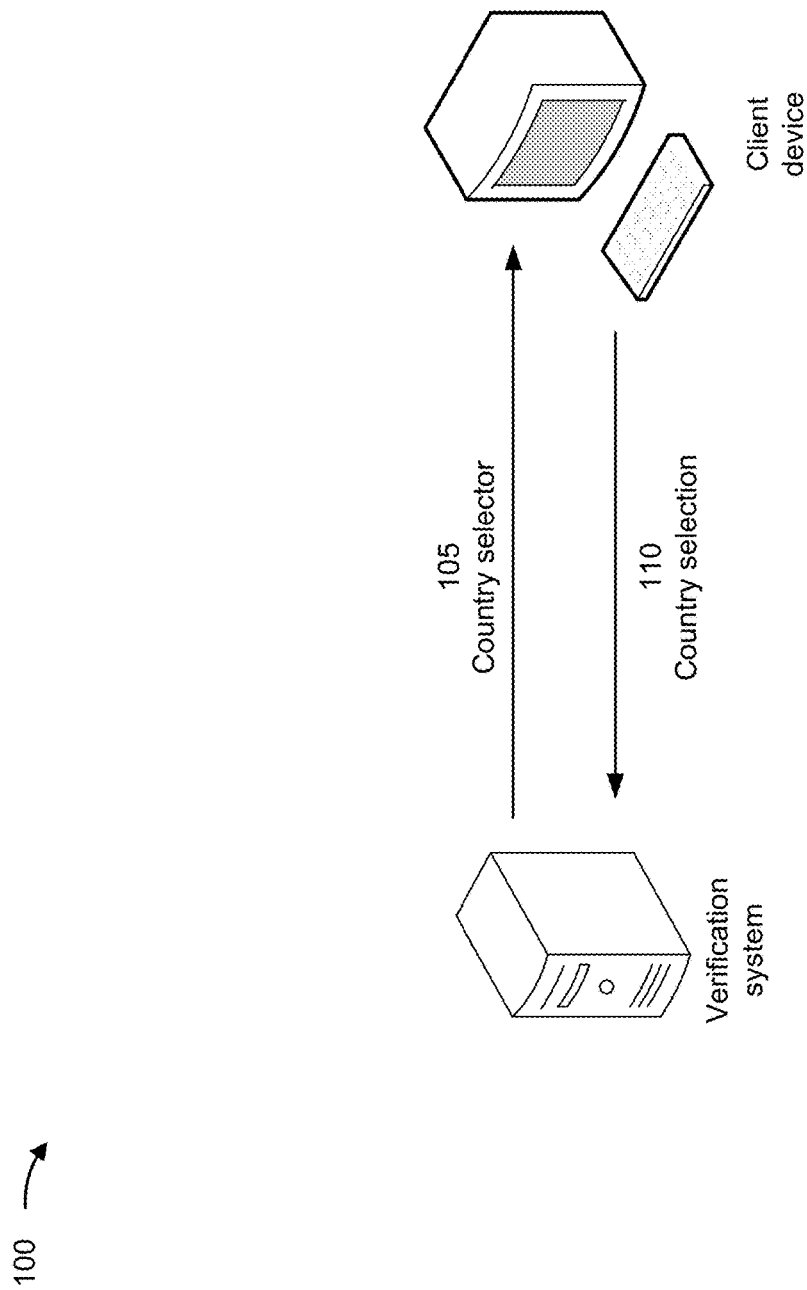

As shown in FIG. 1A and by reference number 105, the verification system may transmit, and the client device may receive, instructions for a user interface (UI) including a selector associated with a plurality of countries. For example, an administrator may input a command to the client device that causes the client device to transmit a request to the verification system; accordingly, the request may trigger the verification system to transmit the instructions for the UI. The administrator may interact with a UI such that the command is based on the interaction. In some implementations, the administrator may provide credentials (e.g., one or more credentials) to the client device such that the client device transmits the credentials before, or included with, the request.

As described in connection with FIG. 2, the selector may be a drop-down menu. For example, the drop-down menu may include a list of options corresponding to the plurality of countries. The plurality of countries may be preconfigured. For example, the verification system may receive an indication of the plurality of countries from a storage. The storage may be local to the verification system or may be at least partially separate (e.g., physically, logically, and/or virtually) therefrom. The storage may provide a default plurality of countries or may provide a plurality of countries based on an indication of a setting from the client device (e.g., received previously). Alternatively, the plurality of countries may be based on input from the client device (e.g., included with, or transmitted after, the request described above).

The verification system may provide, and the client device may show, the selector above an area associated with a verification ruleset. For example, as shown in FIG. 2, the selector may be displayed above a box (e.g., one or more boxes) that represents a rule (e.g., one or more rules) within the verification ruleset.

As shown by reference number 110, the client device may transmit, and the verification system may receive, an indication of a selected country from the plurality of countries. In some implementations, the administrator may interact with the selector (e.g., using a mouse, a touchscreen, a keyboard, and/or another type of input component) in order to select from the list of options. The verification system may therefore receive (e.g., from a local storage or an at least partially separate storage) a data structure representing a verification ruleset associated with the selected country. Alternatively, the verification system may generate a new data structure representing a verification ruleset associated with the selected country (e.g., when the selected country is not associated with a previously stored verification ruleset).

As shown in FIG. 1B and by reference number 115, the verification system may transmit, and the client device may receive, instructions for a UI including visual selectors associated with a first verification rule in the verification ruleset. The visual selectors may be based on the selected country, from the plurality of countries, as described above. Alternatively, the visual selectors may be based on a default country (e.g., stored in a memory associated with the verification system).

In some implementations, the UI may include a pair of visual selectors (e.g., at least one pair of visual selectors). A first selector of the pair may be associated with a type of user information, and a second selector of the pair may be associated with a type of matching. For example, the type of user information may be a name, an address, a telephone number, a date of birth (DOB), and/or a national identification number, among other examples. The type of matching may be a full match or a partial match. A "full match" refers to a match across all characters after filtering (e.g., after removing spaces, hyphens, and/or other characters and/or after converting to all lowercase or all uppercase, among other examples). A "partial match" refers to a quantity (or percentage or fraction) of matching characters that satisfies a partial match threshold. Additionally, or alternatively, a "partial match" may include a fuzzy match, where matching is based on words with approximately similar spellings and meanings. In some implementations, the partial match threshold may be a default value or may be selected by the administrator (e.g., using the UI).

The verification system may provide, and the client device may show, the visual selectors within a visual region associated with the first verification rule. For example, as shown in FIG. 2, the visual selectors may be displayed within a box that represents the first verification rule within the verification ruleset.

As shown by reference number 120, the client device may transmit, and the verification system may receive, a selection for the ruleset using the visual selectors. In some implementations, the administrator may interact with the visual selectors (e.g., using a mouse, a touchscreen, a keyboard, and/or another type of input component) in order to pair a type of user information with a type of matching (e.g., to form part of the first verification rule). Accordingly, the client device may indicate a condition that should form part of the first verification rule based on interaction with the visual selectors.

The verification system may modify the first verification rule based on the interaction with visual selectors (e.g., included in the visual region corresponding to the first verification rule, as described above). The verification system may generate (or modify) a data structure associated with the selected country to indicate the first verification rule based on the interaction with the visual selectors. For example, the verification system may indicate a condition, based on the interaction with the visual selectors, that forms a part of the first verification rule for the ruleset associated with the selected country. As shown by reference number 125, the verification system may store the modified first verification rule. The verification system may output a file (e.g., encoding the data structure described above) to a storage that is local to the verification system or that is at least partially separate (e.g., physically, logically, and/or virtually) therefrom.

As shown in FIG. 1C, the verification system may transmit, and the client device may receive, instructions for a UI including visual selectors associated with additional verification rules (e.g., a second verification rule) in the verification ruleset. For example, as shown by reference number 130, the verification system may transmit, and the client device may receive, instructions for a UI including visual selectors associated with the second verification rule in the verification ruleset. In some implementations, the UI may include a pair of visual selectors (e.g., at least one pair of visual selectors), as described above. The verification system may thus provide, and the client device may show, the visual selectors within a visual region associated with the second verification rule. For example, as shown in FIG. 2, the visual selectors may be displayed within a box that represents the second verification rule within the verification ruleset.

As shown by reference number 135, the client device may transmit, and the verification system may receive, a selection for the ruleset using the visual selectors. The verification system may modify the second verification rule based on the interaction with visual selectors (e.g., included in the visual region corresponding to the second verification rule, as described above). As shown by reference number 140, the verification system may store the modified second verification rule. The verification system may output a file (e.g., encoding a data structure associated with the selected country) to a storage that is local to the verification system or that is at least partially separate (e.g., physically, logically, and/or virtually) therefrom.

The administrator may use the selector to quickly move between verification rulesets. For example, the client device may transmit, and the verification system may receive, an indication of an additional country from the plurality of countries. In some implementations, the administrator may interact with the selector (e.g., using a mouse, a touchscreen, a keyboard, and/or another type of input component) in order to select from the list of options. The verification system may therefore receive (e.g., from a local storage or an at least partially separate storage) a data structure representing a verification ruleset associated with the additional country. Alternatively, the verification system may generate a new data structure representing a verification ruleset associated with the additional country (e.g., when the additional country is not associated with a previously stored verification ruleset).

Accordingly, the verification system may transmit, and the client device may receive, instructions for a UI including visual selectors associated with verification rules in a verification ruleset for the additional country. In some implementations, the UI may include a pair of visual selectors (e.g., at least one pair of visual selectors), as shown in FIG. 2. Therefore, the client device may transmit, and the verification system may receive, a selection for the ruleset for the additional country using the visual selectors. The verification system may modify the verification rules based on the interaction with the visual selectors (e.g., included in the visual regions corresponding to the verification rules, as described herein). The verification system may store the modified verification rules for the additional country. The verification system may output a file (e.g., encoding a data structure associated with the additional country) to a storage that is local to the verification system or that is at least partially separate (e.g., physically, logically, and/or virtually) therefrom.

Figure 1D:
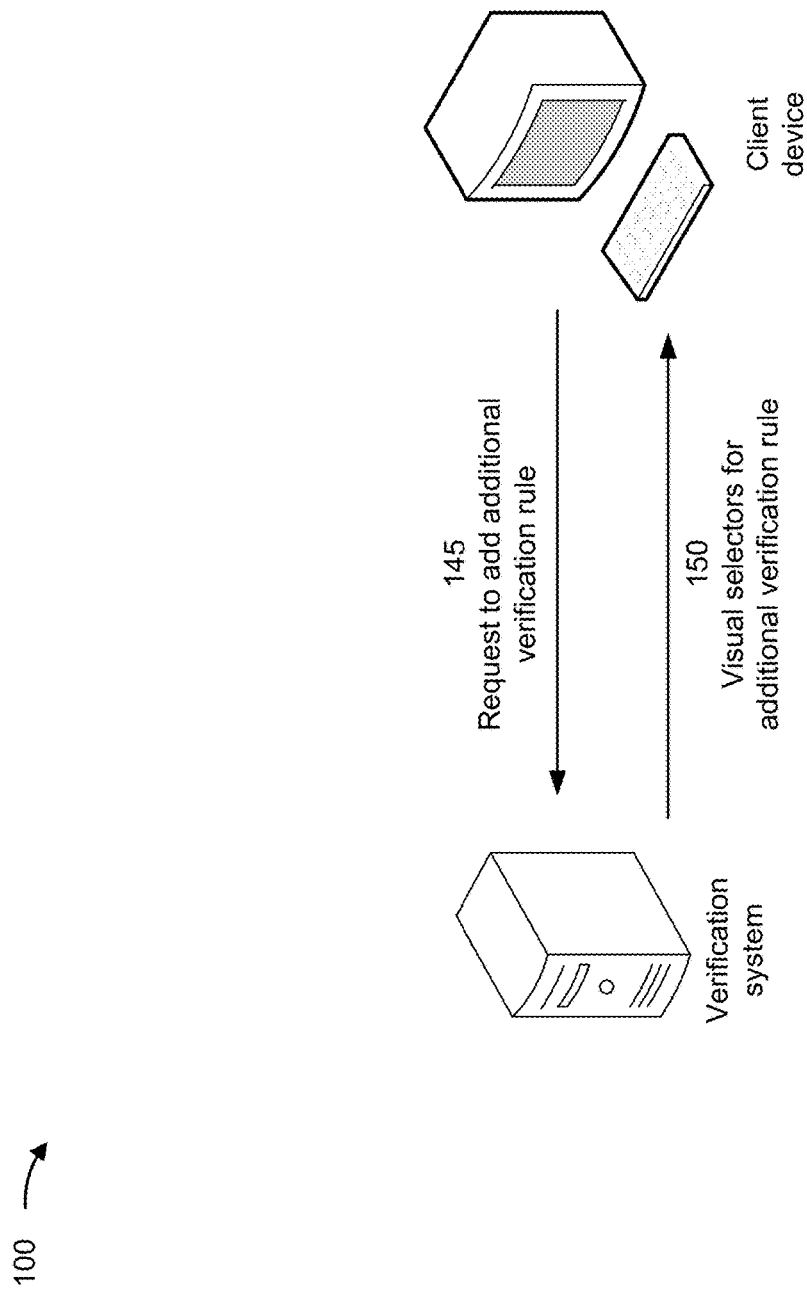

As shown in FIG. 1D and by reference number 145, the client device may transmit, and the verification system may receive, input associated with adding an additional verification rule. In some implementations, the administrator may interact with a button (e.g., using a mouse, a touchscreen, a keyboard, and/or another type of input component) in order to request addition of a new verification rule.

Accordingly, the verification system may generate instructions to update the UI with a new visual region associated with the additional verification rule. As shown by reference number 150, the verification system may transmit, and the client device may receive, instructions to update the UI with additional visual selectors associated with the additional verification rule. In some implementations, the UI may include an additional pair of visual selectors (e.g., at least one additional pair of visual selectors), as shown in FIG. 2. The verification system may provide, and the client device may show, the additional visual selectors within the visual region associated with the additional verification rule. For example, as shown in FIG. 2, the additional visual selectors may be displayed within an additional box that represents the additional verification rule within the verification ruleset.

Figure 1E:
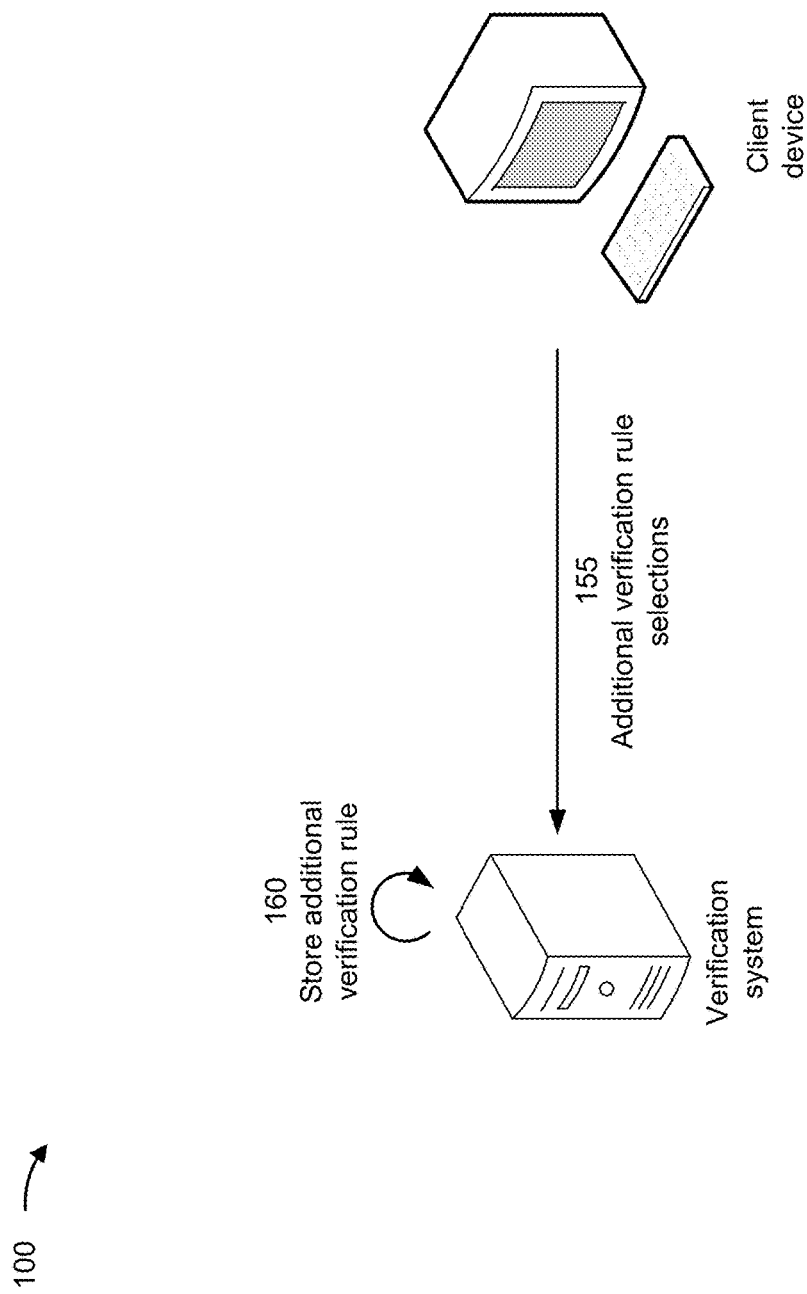

As shown in FIG. 1E, the client device may use the additional visual selectors to modify the additional verification rule. For example, as shown by reference number 155, the client device may transmit, and the verification system may receive, a selection for the additional verification rule using the additional visual selectors. The verification system may modify the additional verification rule based on the interaction with the additional visual selectors (e.g., included in the visual region corresponding to the additional verification rule, as described above). As shown by reference number 160, the verification system may store the modified additional verification rule for the verification ruleset. The verification system may output a file (e.g., encoding a data structure associated with the selected country) to a storage that is local to the verification system or that is at least partially separate (e.g., physically, logically, and/or virtually) therefrom.

Conversely, verification rules may be removed. For example, the client device may transmit, and the verification system may receive, input associated with deletion of the first verification rule. In some implementations, the administrator may interact with a button (e.g., using a mouse, a touchscreen, a keyboard, and/or another type of input component) in order to request deletion of the first verification rule.

Accordingly, the verification system may generate instructions to update the UI by removing the visual region associated with the first verification rule. The verification system may transmit, and the client device may receive, instructions to update the UI by removing the visual selectors associated with the first verification rule. Additionally, the verification system may modify the verification ruleset based on removing the first verification rule. The verification system may remove a data structure representing the first verification rule from a parent data structure representing the verification ruleset. The verification system may remove the first verification rule by modifying a file (e.g., encoding a data structure associated with the selected country) in a storage that is local to the verification system or that is at least partially separate (e.g., physically, logically, and/or virtually) therefrom.

Similarly, conditions within the verification rules may be added. For example, the client device may transmit, and the verification system may receive, input associated with addition to the first verification rule. In some implementations, the administrator may interact with a button (e.g., using a mouse, a touchscreen, a keyboard, and/or another type of input component) in order to request addition to the first verification rule.

Accordingly, the verification system may generate instructions to update the UI with new visual selectors associated with the first verification rule. In some implementations, the UI may include a new pair of visual selectors (e.g., at least one new pair of visual selectors), as shown in FIG. 2. The verification system may provide, and the client device may show, the new visual selectors within the visual region associated with the first verification rule. For example, as shown in FIG. 2, the new visual selectors may be displayed within the box that represents the first verification rule within the verification ruleset.

The client device may use the new visual selectors to modify the first verification rule. For example, the client device may transmit, and the verification system may receive, a selection for the first verification rule using the new visual selectors. The verification system may modify the first verification rule based on the interaction with the new visual selectors (e.g., included in the visual region corresponding to the first verification rule, as described above). The verification system may store the modified first verification rule for the verification ruleset. The verification system may output a file (e.g., encoding a data structure associated with the selected country) to a storage that is local to the verification system or that is at least partially separate (e.g., physically, logically, and/or virtually) therefrom.

Conversely, conditions within the verification rules may be removed. For example, the client device may transmit, and the verification system may receive, input associated with deletion from the first verification rule. In some implementations, the administrator may interact with a button (e.g., using a mouse, a touchscreen, a keyboard, and/or another type of input component) in order to request deletion from the first verification rule.

Accordingly, the verification system may generate instructions to update the UI by removing the visual selectors associated with a portion of the first verification rule. The verification system may transmit, and the client device may receive, instructions to update the UI by removing the visual selectors associated with a condition of the first verification rule. Additionally, the verification system may modify the verification ruleset based on removing the condition from the first verification rule. The verification system may modify a file (e.g., encoding a data structure associated with the first verification rule) in a storage that is local to the verification system or that is at least partially separate (e.g., physically, logically, and/or virtually) therefrom.

Figure 1F:
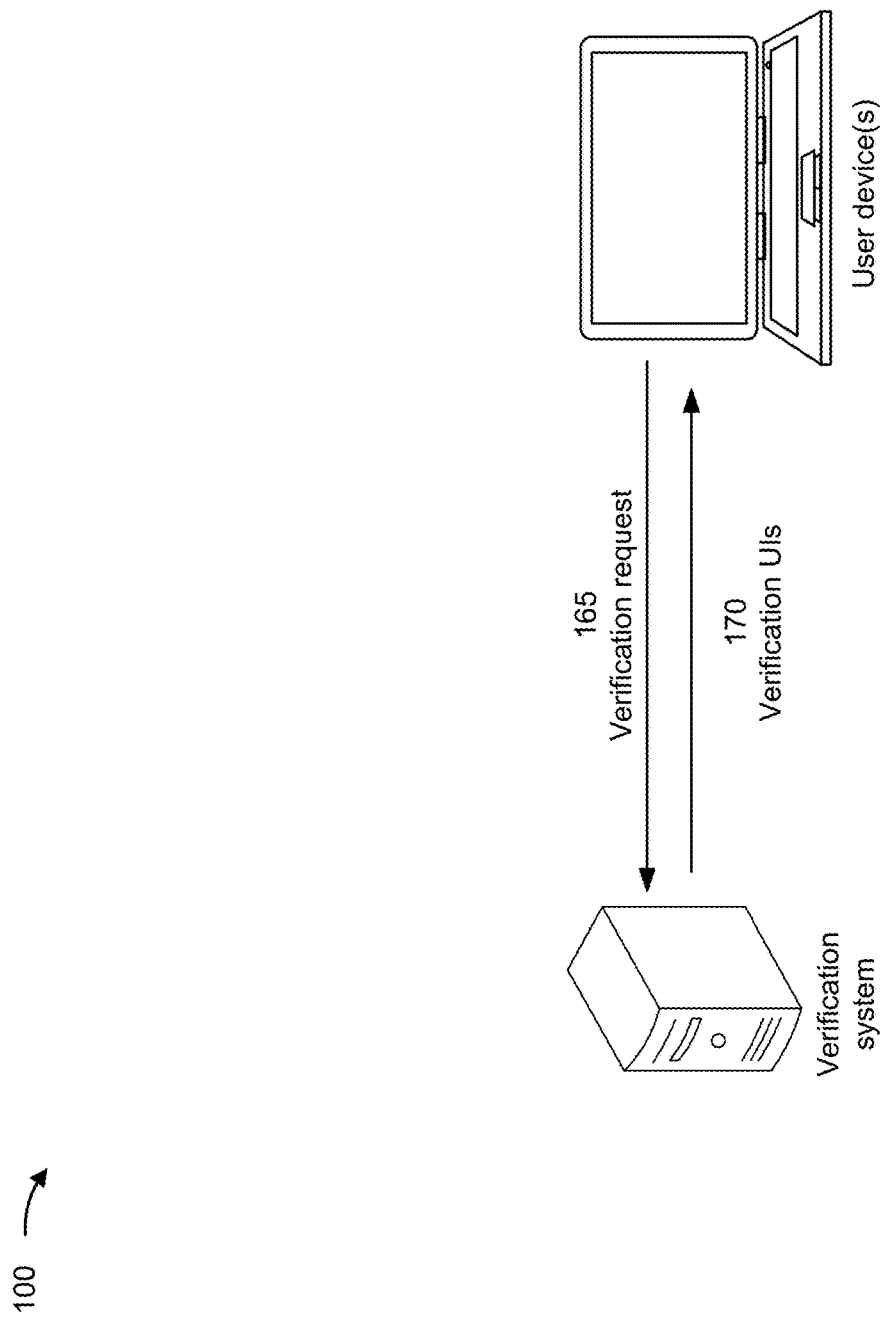

As shown in FIG. 1F and by reference number 165, the user device may transmit, and the verification system may receive, a request for verification. For example, the user of the user device may input a command to the user device that causes the user device to transmit the request to the verification system. The user may interact with a UI such that the command is based on the interaction. In some implementations, the user may provide credentials (e.g., one or more credentials) to the user device such that the user device transmits the credentials before, or included with, the request.

In response to the request, the verification system may retrieve instructions for generating a set of UIs. In some implementations, the verification system may determine a location of the user device. For example, the verification system may request the location from a cellular network associated with the user device and/or may perform a lookup of the location based on an Internet protocol (IP) address associated with the user device, among other examples. Additionally, or alternatively, the user device may transmit, and the verification system may receive, an indication of the location of the user device. For example, the verification system may request the location from an operating system (OS) of the user device and/or from a sensor of the user device, such as a global positioning system (GPS) sensor or another type of global navigation satellite system (GNSS) sensor. Accordingly, the verification system may retrieve the instructions for generating the set of UIs based on the location.

Figure 1G:
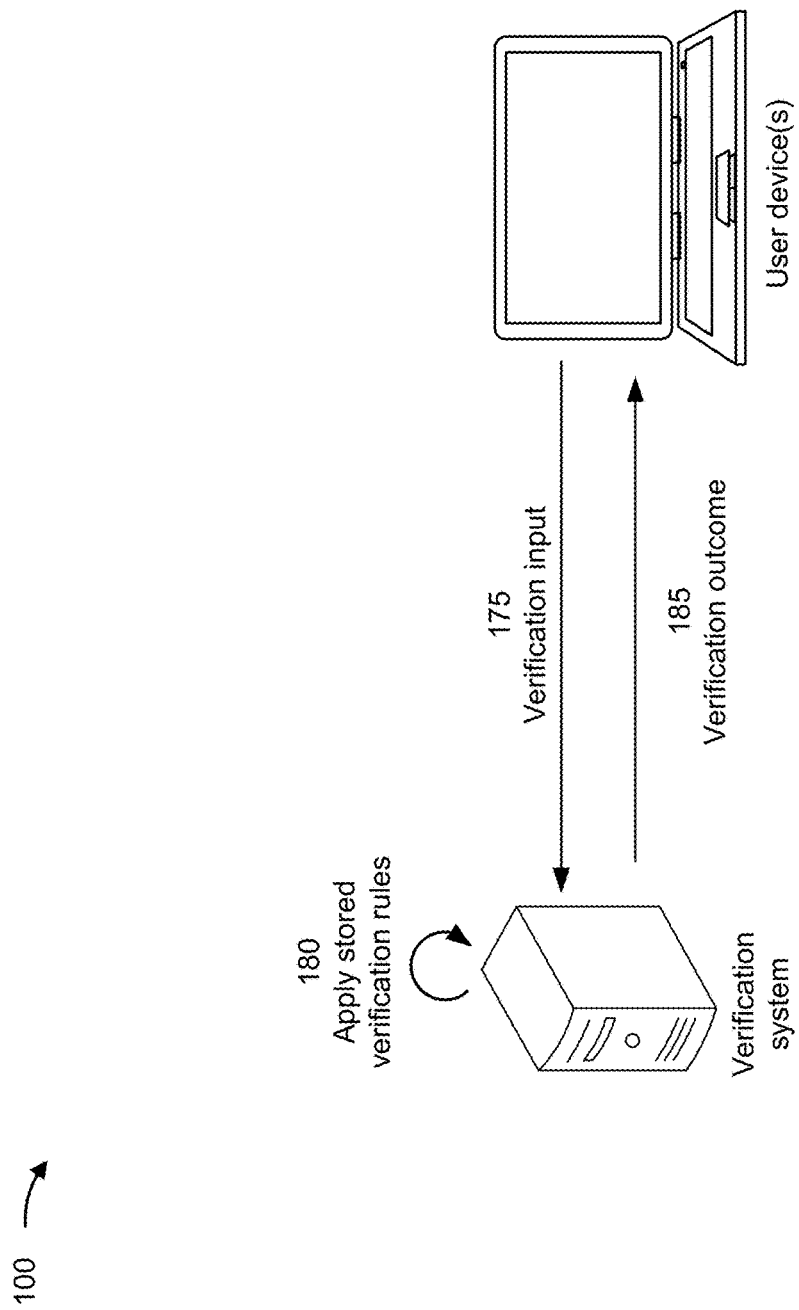

As shown by reference number 170, the verification system may transmit, and the user device may receive, at least a portion of the instructions for generating the set of UIs. As shown in FIG. 1G and by reference number 175, the user device may transmit, and the verification system may receive, input associated with the user for verification. For example, the user may interact with the set of UIs such that the input is based on the interaction.

In some implementations, the verification system may receive the input from a plurality of user devices. Accordingly, the verification system may transmit, and the user device may receive, instructions for generating a first UI (e.g., at least one first UI). Thus, the verification system may receive a first portion of the input based on interaction with the first UI. Additionally, the verification system may transmit, and an additional user device may receive, instructions for generating a second UI (e.g., at least one second UI). Thus, the verification system may receive a second portion of the input based on interaction with the second UI.

The verification system may determine whether to verify the user. As shown by reference number 180, the verification system may apply the input to stored verification rules (e.g., one or more stored verification rules). In some implementations, the verification system may apply the type of matching (e.g., indicated using a second visual selector associated with a stored verification rule) to a portion of the input from the user device corresponding to the type of user information (e.g., indicated using a first visual selector associated with a stored verification rule). In one example, the verification system may verify a name (first name, last name, or full name) against a database for a full match. In another example, the verification system may verify an address against a database for a partial match. In yet another example, the verification system may verify a DOB against a database for a full match.

As shown by reference number 185, the verification system may transmit, and the user device may receive, an indication of a verification outcome. For example, the verification outcome may be a Boolean (such as a pass or a fail). The indication may be an overall indication of all applied verification rules (e.g., strung together using AND operations). Additionally, or alternatively, the indication may include indications corresponding to each verification rule (e.g., indicating separate outcomes from applying separate portions of the input to separate matching types from the verifications rules).

By using techniques as described in connection with FIGS. 1A-1G, the verification system generates UIs that allow the administrator to construct verification rulesets. Using the UIs to construct verification rulesets conserves memory space, power, and processing resources as compared with multiple cycles of coding, compiling, and debugging the verification rulesets. Additionally, the verification system provides a country selector in order to quickly customize the verification rulesets on a per-country basis. As a result, memory space, power, and processing resources are conserved as compared with re-performing (e.g., from scratch) cycles of compiling and debugging for each country's rulesets individually.

As indicated above, FIGS. 1A-1G are provided as an example. Other examples may differ from what is described with regard to FIGS. 1A-1G.

Figure 2:
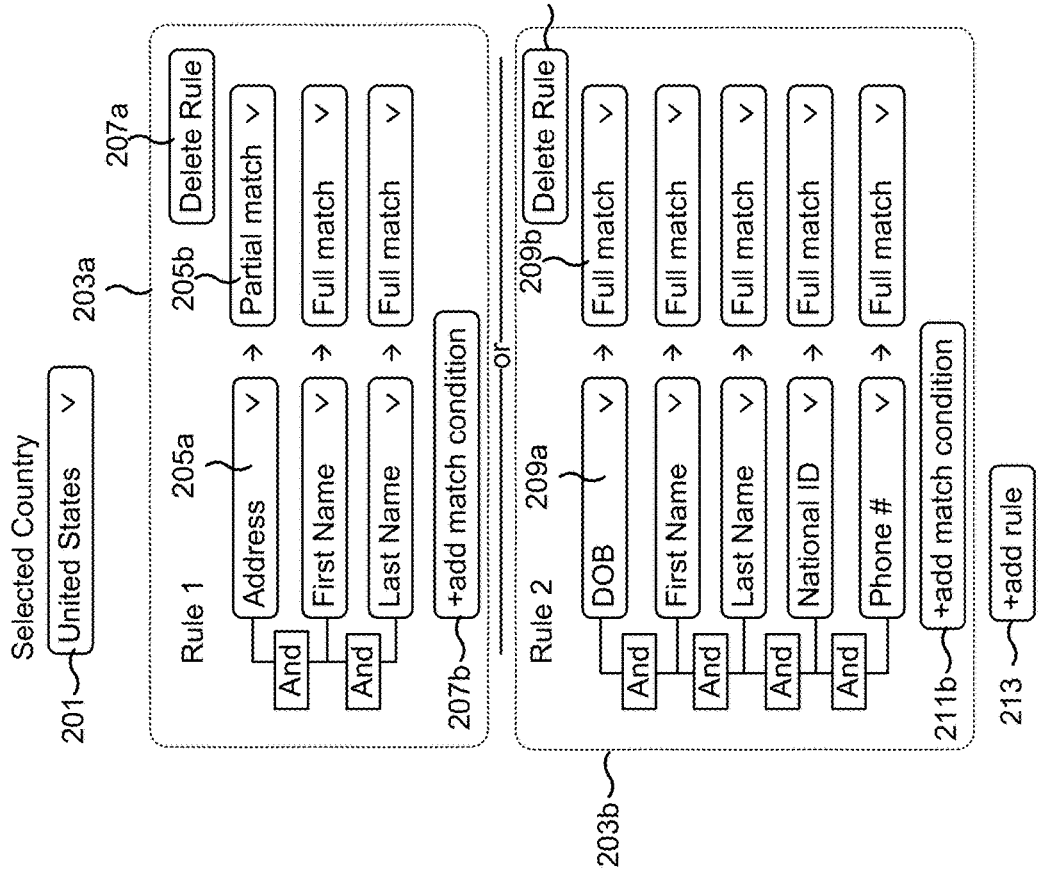
FIG. 2 is a diagram of an example user interface associated with programming verification rulesets.

FIG. 2 is a diagram of an example UI 200 associated with programming verification rulesets. As described in connection with FIGS. 1A-1G, a verification system may generate and transmit, and a client device may receive and show, a UI as illustrated by example UI 200. The verification system and the client device are described in more detail below in connection with FIGS. 3 and 4.

As shown in FIG. 2, the example UI 200 includes a drop-down menu 201 (or another type of input component) for selecting a country from a plurality of countries. As further shown in FIG. 2, the example UI 200 includes visual regions (e.g., one or more visual regions) associated with verification rules (e.g., one or more verification rules) for the selected country. For example, visual region 203a may be associated with a first verification rule, and visual region 203b may be associated with a second verification rule. The visual regions 203a and 203b may each include a group of pixels logically distinct from a remaining portion of pixels in the example UI 200, as shown in FIG. 2. Additionally, or alternatively, the visual regions 203a and 203b may each be delineated by a border. Although depicted with two visual regions, additional visual regions corresponding to additional verification rules may be included.

Each visual region may include visual selectors (e.g., at least one pair of visual selectors). For example, the visual region 203a includes visual selector 205a paired with visual selector 205b, and the visual region 203b includes visual selector 209a paired with visual selector 209b. The first selectors 205a and 209a may be associated with a type of user information (e.g., an address, a DOB, a first name, a last name, a national identity number, a phone number, and/or similar types of information), and the second selectors 205b and 209b may be associated with a type of matching (e.g., a full match or a partial match).

Although the example UI 200 is shown with visual selectors, other examples may additionally or alternatively include text boxes. Similarly, although the example UI 200 is shown with pairs of visual selectors, other examples may include triplets or a group of visual elements with more than three elements. For example, a first selector may allow selection of a type of login (e.g., email or username, among other examples), a second selector may allow selection of a limit (e.g., a maximum quantity of accounts or a maximum quantity of verification attempts, among other examples), and a text box may accept a number for the limit. Accordingly, the example UI 200 may be used to construct a verification rule that limits how many accounts or verification attempts a user may have.

Additionally, each visual region may include a first button (or other type of input component) associated with removal of the corresponding verification rule and a second button (or other type of input component) associated with modifying the corresponding verification rule (e.g., by adding a condition and thus adding a pair of visual selectors to the visual region to allow for the modification). For example, the visual region 203a includes first button 207a and second button 207b, and the visual region 203b includes first button 211a and second button 211b.

Furthermore, the example UI 200 includes a button 213 (or other type of input component) associated with generating a new verification rule and thus adding a new visual region associated with the new verification rule.

As indicated above, FIG. 2 is provided as an example. Other examples may differ from what is described with regard to FIG. 2.

Figure 3:
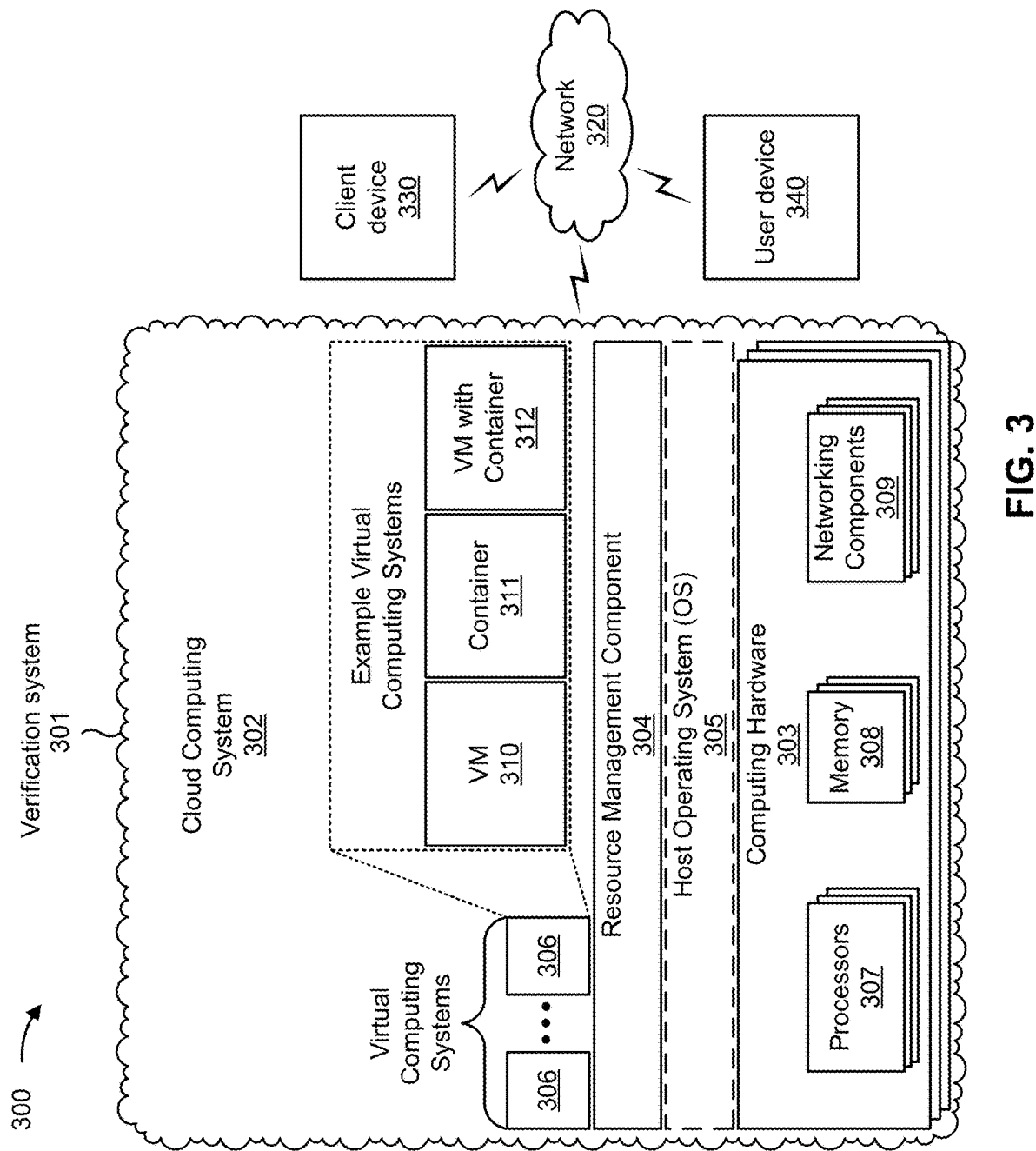
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a verification system 301, which may include one or more elements of and/or may execute within a cloud computing system 302. The cloud computing system 302 may include one or more elements 303-312, as described in more detail below. As further shown in FIG. 3, environment 300 may include a network 320, a client device 330 and/or a user device 340. Devices and/or elements of environment 300 may interconnect via wired connections and/or wireless connections.

The cloud computing system 302 may include computing hardware 303, a resource management component 304, a host OS 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the verification system 301 may include one or more elements 303-312 of the cloud computing system 302, may execute within the cloud computing system 302, and/or may be hosted within the cloud computing system 302, in some implementations, the verification system 301 may not be cloud-based (e.g., may be implemented outside of a cloud computing system) or may be partially cloud-based. For example, the verification system 301 may include one or more devices that are not part of the cloud computing system 302, such as device 400 of FIG. 4, which may include a standalone server or another type of computing device. The verification system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The client device 330 may include one or more devices capable of receiving, generating, storing, processing, providing, and/or routing information associated with verification rulesets, as described elsewhere herein. The client device 330 may include a communication device and/or a computing device. For example, the client device 330 may include a server, such as an application server, a client server, a web server, a database server, a host server, a proxy server, a virtual server (e.g., executing on computing hardware), or a server in a cloud computing system. In some implementations, the client device 330 may include computing hardware used in a cloud computing environment.

The user device 340 may include one or more devices capable of receiving, generating, storing, processing, and/or providing information associated with verification rules, as described elsewhere herein. The user device 340 may include a communication device and/or a computing device. For example, the user device 340 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
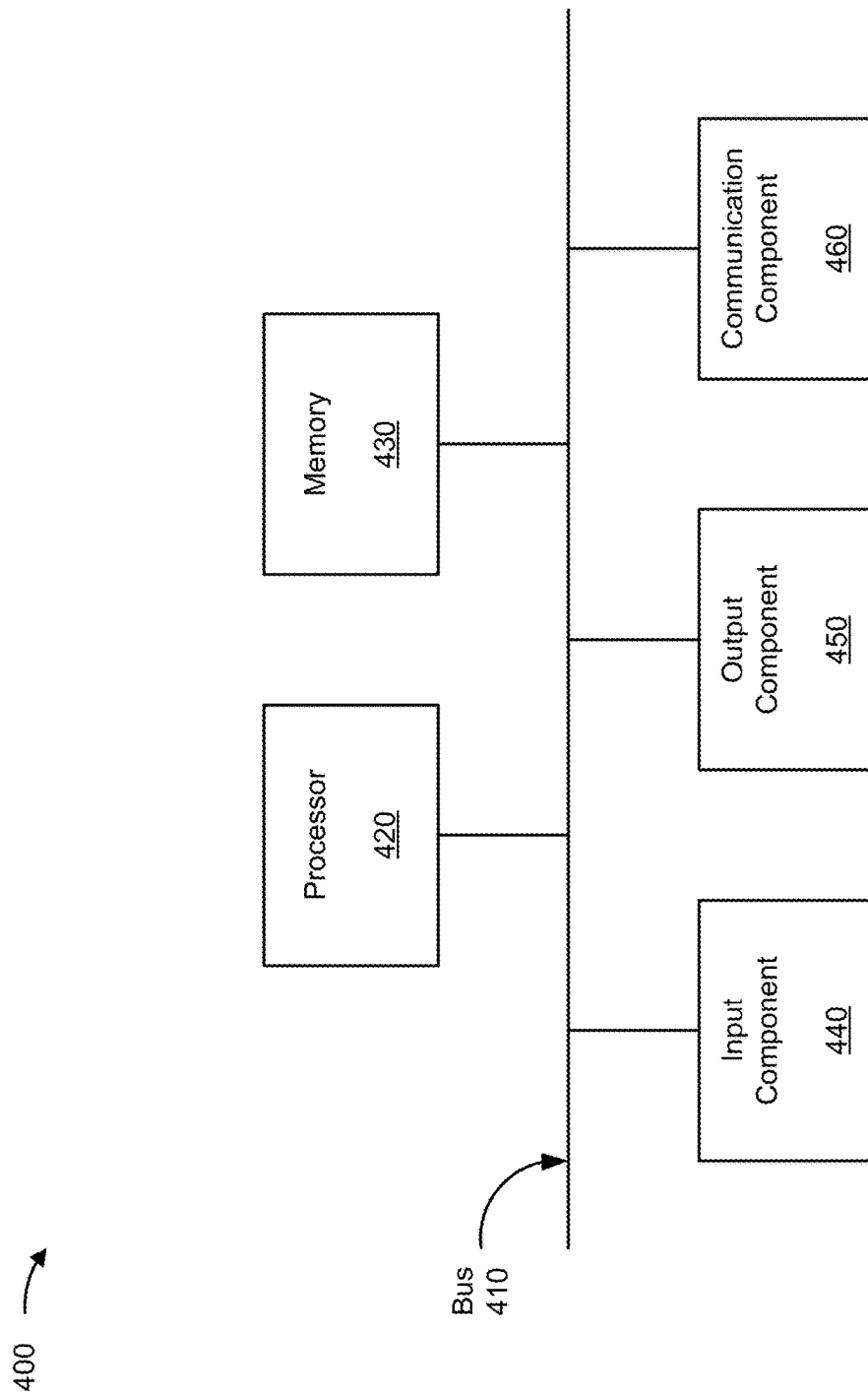
FIG. 4 is a diagram of example components of one or more devices of FIG. 3.

FIG. 4 is a diagram of example components of a device 400 associated with programming verification templates visually. The device 400 may correspond to a client device 330 and/or a user device 340. In some implementations, the client device 330 and/or the user device 340 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
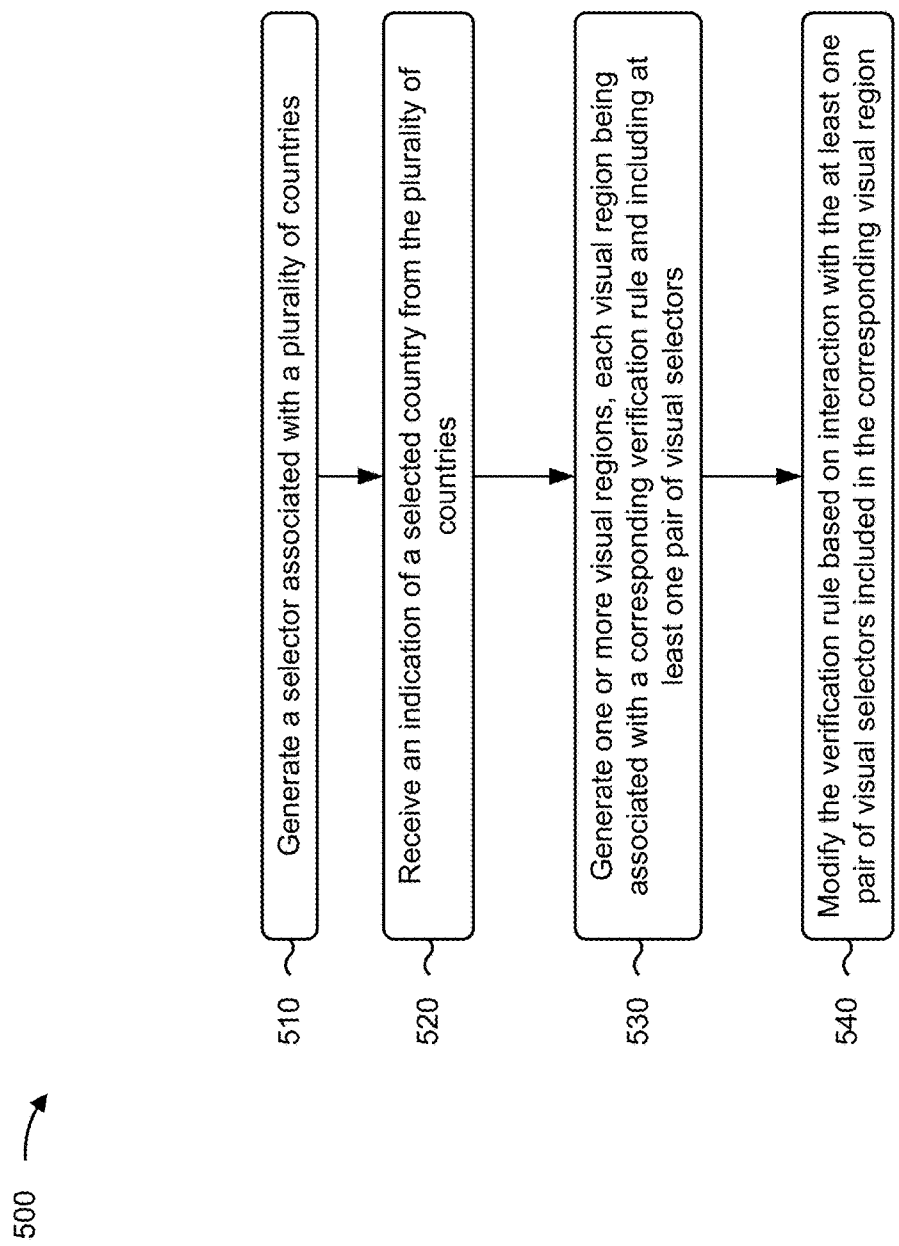
FIG. 5 is a flowchart of an example process relating to programming verification rulesets visually.

FIG. 5 is a flowchart of an example process 500 associated with programming verification rulesets visually. In some implementations, one or more process blocks of FIG. 5 may be performed by the verification system 301. In some implementations, one or more process blocks of FIG. 5 may be performed by another device or a group of devices separate from or including the verification system 301, such as the client device 330 and/or the user device 340. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include generating a selector associated with a plurality of countries (block 510). For example, the verification system 301 (e.g., using processor 420, memory 430, input component 440, and/or communication component 460) may generate a selector associated with a plurality of countries, as described above in connection with reference number 105 of FIG. 1A.

As shown in FIG. 5, process 500 may include receiving an indication of a selected country from the plurality of countries (block 520). For example, the verification system 301 (e.g., using processor 420, memory 430, input component 440, and/or communication component 460) may receive an indication of a selected country from the plurality of countries, as described above in connection with reference number 110 of FIG. 1A.

As further shown in FIG. 5, process 500 may include generating one or more visual regions, each visual region being associated with a corresponding verification rule and including at least one pair of visual selectors (block 530). For example, the verification system 301 (e.g., using processor 420 and/or memory 430) may generate one or more visual regions, each visual region being associated with a corresponding verification rule and including at least one pair of visual selectors, as described above in connection with reference number 115 of FIG. 1B and reference number 130 of FIG. 1C.

As further shown in FIG. 5, process 500 may include modifying the verification rule based on interaction with the at least one pair of visual selectors included in the corresponding visual region (block 540). For example, the verification system 301 (e.g., using processor 420 and/or memory 430) may modify the verification rule based on interaction with the at least one pair of visual selectors included in the corresponding visual region, as described above in connection with reference number 125 of FIG. 1B and reference number 140 of FIG. 1C.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1G and/or FIG. 2.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing a visual interface for programming verification rulesets, the system comprising:
   one or more memories; and
   one or more processors, coupled to the one or more memories, configured to:
      generate a visual region associated with a verification rule, wherein the visual region includes at least one pair of visual selectors with a first selector associated with a type of user information and a second selector associated with a type of matching;
      modify the verification rule based on interaction with the at least one pair of visual selectors included in the visual region; and
      determine whether to verify a user according to the modified verification rule.

2. The system of claim 1, wherein the type of user information comprises a name, an address, a telephone number, a date of birth, or a national identification number.

3. The system of claim 1, wherein the type of matching comprises a full match or a partial match.

4. The system of claim 1, wherein the one or more processors are further configured to:
   receive input associated with deletion of the verification rule; and
   remove the visual region based on the input associated with deletion of the verification rule.

5. The system of claim 4, wherein the one or more processors, to receive the input associated with deletion of the verification rule, are configured to:

generate a button associated with deletion of the verification rule,
wherein the input associated with deletion of the verification rule is based on interaction with the button.

6. The system of claim 1, wherein the one or more processors are further configured to:
receive input associated with addition to the verification rule; and
generate an additional pair of visual selectors in the visual region.

7. The system of claim 6, wherein the one or more processors, to receive the input associated with addition to the verification rule, are configured to:
generate a button associated with addition to the verification rule,
wherein the input associated with addition to the verification rule is based on interaction with the button.

8. The system of claim 1, wherein the at least one pair of visual selectors comprise a plurality of pairs of visual selectors, and the one or more processors are further configured to:
receive input associated with deletion from the verification rule; and
remove a first pair of visual selectors, of the plurality of pairs of visual selectors, based on the input associated with deletion from the verification rule.

9. The system of claim 8, wherein the one or more processors, to receive the input associated with deletion from the verification rule, are configured to:
generate a button associated with deletion from the verification rule,
wherein the input associated with deletion from the verification rule is based on interaction with the button.

10. The system of claim 1, wherein the one or more processors are further configured to:
receive input associated with adding an additional verification rule; and
generate an additional visual region associated with the additional verification rule that includes at least one additional pair of visual selectors.

11. The system of claim 10, wherein the one or more processors, to receive the input associated with adding the additional verification rule, are configured to:
generate a button associated with adding verification rules,
wherein the input associated with adding the additional verification rule is based on interaction with the button.

12. A method of providing a visual interface for programming verification rulesets, comprising:
generating, by one or more processors, a visual region associated with a verification rule, wherein the visual region includes at least one pair of visual selectors, with a first selector for selecting a type of user information and a second selector for choosing a type of matching;
modifying, by the one or more processors, the verification rule based on user interaction with the at least one pair of visual selectors in the visual region; and
determining, by the one or more processors, whether to verify a user according to the modified verification rule.

13. The method of claim 12, further comprising:
storing, by the one or more processors, the modified verification rule in one or more memories;
receiving, by the one or more processors, input associated with a user from a user device, the input including user information selected based on a configuration corresponding to the visual region; and
determining, by the one or more processors, whether to verify the user by applying the input to the modified verification rule, wherein the determination is based on whether the input conforms to a dynamic set of criteria established by the modified verification rule.

14. The method of claim 13, wherein receiving input from the user device comprises:
transmitting, by the one or more processors, instructions to generate a user interface (UI) to the user device, wherein the UI is configured to facilitate a collection of input associated with the verification rule; and
receiving, by the one or more processors, a first portion of the input based on user interaction with the UI.

15. The method of claim 13, wherein applying the input to the modified verification rule comprises:
applying, by the one or more processors, the type of matching within the visual region to a portion of the input that corresponds to the type of user information.

16. The method of claim 13, further comprising:
transmitting, by the one or more processors, an indication of an outcome of a verification process, wherein the outcome is determined based on application of the input to the modified verification rule.

17. A non-transitory computer-readable medium storing a set of instructions for providing a visual interface for programming verification rulesets, the set of instructions comprising:
one or more instructions that, when executed by one or more processors of a device, cause the device to:
receive an indication of a selected nation from a plurality of nations;
generate a visual region associated with a verification rule, wherein each visual region includes at least one pair of visual selectors for selecting a type of user information and a type of matching related to the selected nation; and
modify the verification rule based on interaction with the at least one pair of visual selectors included in the visual region.

18. The non-transitory computer-readable medium of claim 17, wherein the one or more instructions, when executed by the one or more processors, further cause the device to:
receive an indication of an additional nation from the plurality of nations; generate one or more additional visual regions, each associated with an additional verification rule and including at least one additional pair of visual selectors related to the additional nation; and
modify the additional verification rule based on interaction with the at least one additional pair of visual selectors in each additional visual region.

19. The non-transitory computer-readable medium of claim 17, wherein the one or more instructions, when executed by the one or more processors, further cause the device to:
generate a button, associated with the visual region, for deleting the verification rule based at least in part on nation-specific aspects of the verification rule.

20. The non-transitory computer-readable medium of claim 17, wherein the one or more instructions, when executed by the one or more processors, further cause the device to:
generate a button for adding an additional verification rule related to a new or existing nation, wherein activation of the button causes generation of an additional visual region associated with the new verification rule.

* * * * *